US006963637B2

(12) United States Patent
Broussard et al.

(10) Patent No.: US 6,963,637 B2
(45) Date of Patent: Nov. 8, 2005

(54) METHODS, SYSTEMS, AND MEDIA TO CAPTURE A REDIALING SEQUENCE AND TO REDIAL

(75) Inventors: Scott J. Broussard, Cedar Park, TX (US); Ying Liu, Austin, TX (US); Mark A. Sehorne, Round Rock, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 10/324,739

(22) Filed: Dec. 18, 2002

(65) Prior Publication Data

US 2004/0120503 A1   Jun. 24, 2004

(51) Int. Cl.[7] .......................... H04M 3/42; H04M 1/00; H04M 3/00
(52) U.S. Cl. .............................. 379/209.01; 379/355.02
(58) Field of Search ...................... 379/355.01, 355.02, 379/356.01, 209.01, 210.01

(56) References Cited

U.S. PATENT DOCUMENTS 5,966,436 A * 10/1999 Kim ...................... 379/216.01
2001/0040961 A1 * 11/2001 Wang

FOREIGN PATENT DOCUMENTS

JP          361123250 A  *  6/1986  ........... H04M 1/27

OTHER PUBLICATIONS

Uniden America Corporation, The EXR 2460 Owner's Manual, Jun. 1999, p. 17, Uniden America Corporation.
Ambassador Enterprises, INC., Administrative Telephone, Intercom & Voicemail, http://www.ae-systems.com, pp. 10-11, 2001, Ambassador Enterprises, Inc.
LGE Service USA, Frequently Asked Questions: Cellular Phones—SP510/TP1100, http://www.lgeservice.com, pp. 1-4, 2002, LGE Service USA.
Telus Mobility, Advanced Phone Book Entries on the Sanyo SCP 4500, http://telusmobility.com, pp. 103, 2002, Tele-Mobile Company.

* cited by examiner

Primary Examiner—Benny Q. Tieu
(74) Attorney, Agent, or Firm—Joseph P. Lally; Herman Rodriguez (57) ABSTRACT

Methods, systems, and media to capture a redialing sequence and to redial a phone or similar device are disclosed. Embodiments may capture a dialing sequence of a caller and provide access to the dialing sequence, or redialing sequence, when the caller desires to re-establish a telephone connection. More specifically, embodiments recognize a significant pause in a dialing sequence by a caller and associate the pause with a line event such as a circuit event or an audible event, or a length of time. Some embodiments comprise resource managers and agents of the resource manager may monitor a line, and identify, interpret, and/or route the line events to an application server to capture a redialing sequence or replay the redialing sequence to re-establish a telephone connection. Other embodiments incorporate security measures to protect private data and error detection to determine when a redialing sequence is invalid.

18 Claims, 4 Drawing Sheets

METHODS, SYSTEMS, AND MEDIA TO CAPTURE A REDIALING SEQUENCE AND TO REDIAL

FIELD OF INVENTION

The present invention is in the field of telephony and more particularly in the field of telephone redialing technology.

BACKGROUND

The redial function offered on telephones advantageously allows a user to return to a connection that the user previously had or tried to obtain without having to spend the time, effort, and memory to program the number into the telephone. For instance, the user may want to dial a friend staying at a hotel. The friend provided a telephone number and extension. The user can dial the phone number and, after the hotel's telephone system answers, dial the friend's extension.

Unfortunately, the redial function is unable to remember the pause between the telephone number and the extension. When the user attempts to use the redial function, the telephone dials the entire string, the telephone number and the extension, in a single series of tones without a pause to wait until a successful connection is made to the hotel's telephone network and the hotel's telephone network is ready to receive the extension. Further, if the hotel's telephone system receives part of the extension, it may wait for the remaining digits from the user and when the user tries to enter the extension, the hotel's telephone system may incorrectly interpret the first couple digits as the remainder of the extension and connect the user with the incorrect room.

On the other hand, the hotel's system may not receive any of the extension digits. The user may then dial the extension after the hotel's telephone system is ready to receive the extension. Similarly, the redial function offers very little help in situations wherein a sequence of phone numbers are dialed, the dialing of each subsequent number being predicated upon successful connection to intermediate nodes.

SUMMARY OF THE INVENTION

The problems identified above are in large part addressed by methods, systems, and media to capture a redialing sequence and to redial a phone or similar device. Embodiments may capture a dialing sequence of a caller and provide access to the dialing sequence, or redialing sequence, when the caller desires to re-establish a telephone connection. More specifically, embodiments may recognize a significant pause in a dialing sequence by a caller and associate the pause with a line event such as a circuit event or an audible event, or a length of time. Some embodiments comprise resource managers and agents of the resource manager may monitor a line, and identify, interpret, and/or route the line events to an application server to capture a redialing sequence or replay the redialing sequence to re-establish a telephone connection. Other embodiments incorporate security measures to protect private data and error detection to determine when a redialing sequence is invalid.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking the invention, contemplates a system and method for capturing a redialing sequence and for redialing the captured sequence. Embodiments may capture a dialing sequence of a caller and provide access to the dialing sequence, or redialing sequence, when the caller desires to re-establish a telephone connection. More specifically, embodiments recognize a significant pause in a dialing sequence by a caller and associate the pause with a line event such as a circuit event or an audible event, or a length of time. Some embodiments comprise resource managers and agents of the resource manager may monitor a line, and identify, interpret, and/or route the line events to an application server to capture a redialing sequence or replay the redialing sequence to re-establish a telephone connection. Other embodiments incorporate security measures to protect private data and error detection to determine when a redialing sequence is invalid.

Figure 1:
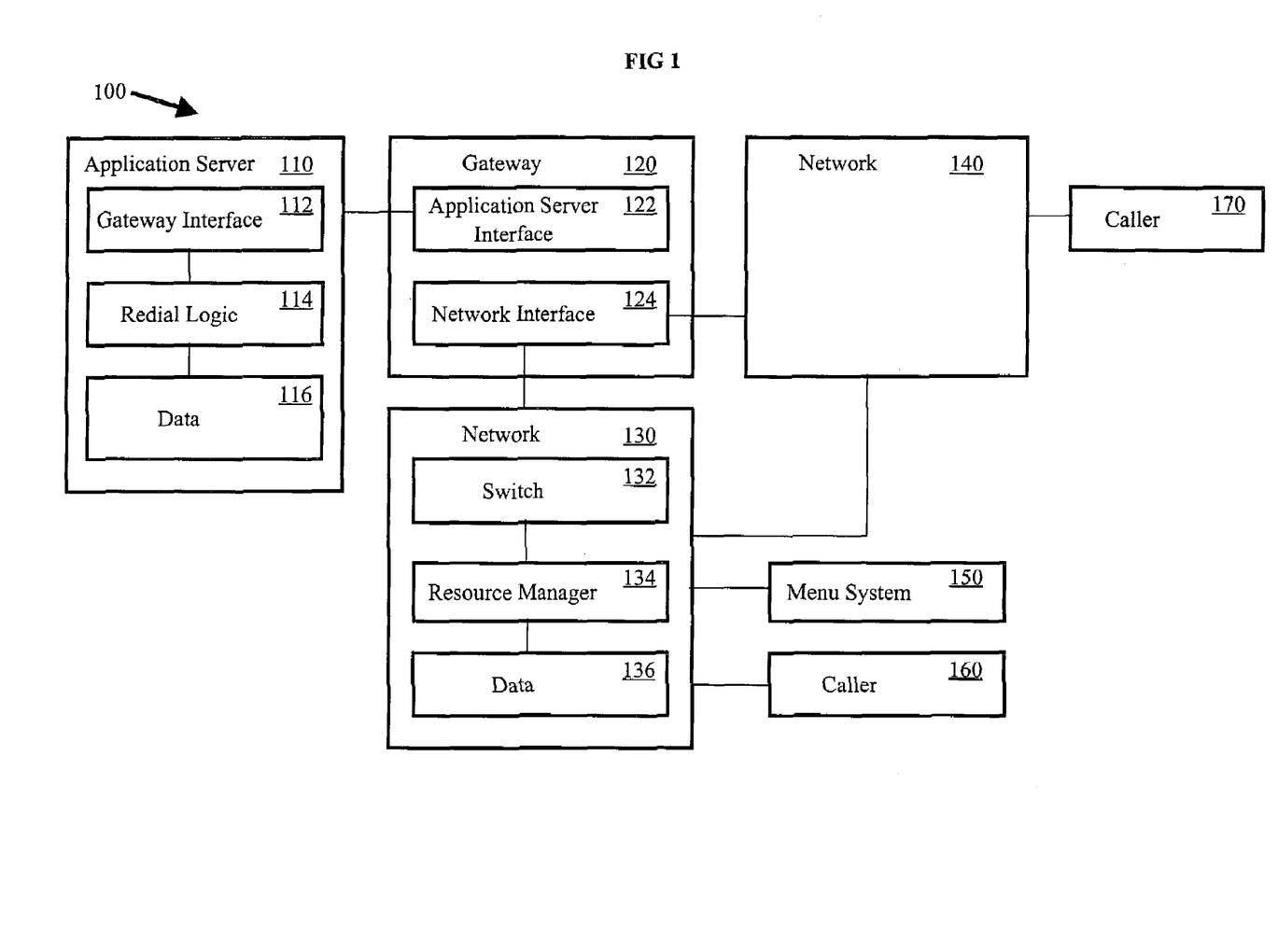
FIG. 1 depicts an embodiment of a system with more than one network, a gateway, and an application server to capture a dialing sequence to redial.

Turning now to the drawings, FIG. 1 depicts an embodiment of a system 100 to capture a dialing sequence to redial. System 100 comprises an application server 110, a gateway 120, a network 130, a network 140, a menu system 150, and callers 160 and 170. Application server 110, such as IBM WebSphere Telecom Application Server, may comprise logic or software to implement a redial function for a telephone network such as a wireless network, a corporate telephone network, a public switched telephone network (PSTN), etc. For example, application server 110 may reside on the Internet and offer a redial function to multiple telephone networks or may be integrated with a single network of a telephone services company like AT&T, Sprint, or the like.

Application server 110 comprises a gateway interface 112, redial logic 114, and data 116. Gateway interface 112 may comprise an application program interface (API) adaptable to one or more gateways and configured to communicate with gateway 120. In particular, gateway interface 112 comprises protocols to securely communicate data to gateway 120 over a medium. For example, when application server 110 is coupled with gateway 120 via the Internet, gateway interface 112 may implement a protocol to encrypt data transmitted from application server 110 to gateway 120, as well as a protocol to decrypt data received from gateway 120 and vice versa. In many of these embodiments, gateway interface 112 implements a protocol to authenticate communications between application server 110 and gateway 120. In other embodiments, a communications medium is dedicated to communication between application server 110 and gateway 120 and gateway interface 112 implements link layer and physical layer protocols to communicate with gateway 120.

Redial logic 114 may receive numbers and line events to store and to replay to re-establish a telephone connection between subscribers of a telephone network such as callers 160 and 170, or between a caller and a system coupled with a telephone network such as menu system 150. In particular, redial logic 114 receives a number or a series of numbers as tones or digital representations of telephone keypad entries, along with pauses, circuit events, audible events and other line events associated with a caller such as caller 170. When a pause is detected between numbers, the length of the pause is compared against a reference pause length, or timer threshold. If the pause length is longer than the timer threshold, a trigger is determined and associated with the numbers. The trigger facilitates recreation of the pause when redialing the numbers and may be or represent a line event between receipt of the numbers such as audible events like a tone, a voice command, the beginning of a voice message, the end of a voice message, or circuit events like connection to a system or another subscriber such as menu system 150 or caller 170. In other embodiments, the trigger is a length of time based upon the length of the pause between the digits.

Once the trigger is determined, the numbers and the trigger, or representations thereof, are stored in data 116. Upon receipt of a command from the same caller or via the same phone line, the stored numbers can be replayed to re-establish the telephone connection for the caller. For example, caller 160 may want to contact caller 170. Caller 160 may dial a first number to connect to menu system 150 and three additional digits separated by pauses to contact caller 170. Each pause allows caller 160 to hear each set of options. Redial logic 114 receives the first number followed by a pause, determines that the pause is longer than a timer threshold, and determines that an audible event, the end of a voice message, is a trigger for the subsequent number. Redial logic 114 then stores the first number and the three additional digits along with three triggers so that each pause may be substantially recreated when redialing the sequence of numbers to reconnect caller 160 to caller 170.

Caller 160 disconnects from caller 170 and decides to contact caller 170 again. Caller 160 presses a redial button, says "redial", or the like to communicate the desire to re-establish a telephone connection with caller 170. Redial logic 114 receives the redial request and replays the first number and the three additional numbers, recreating the pauses based upon the triggers to re-establish the telephone connection. In particular, redial logic 114 outputs the first number, waits to hear an end of a voice message as indicated by the first trigger and outputs the first digit, waits for the end of the second message before outputting the second digit, and waits for the end of the third message before outputting the third digit. In several embodiments, the redial sequence may be transferred to a speed dial function, or the like, in response to a command to do so by caller 160.

In other embodiments, redial logic 114 may store more than one redial sequence, providing redial capabilities for multiple telephone connections. In one such embodiment, redial logic 114 receives a first number, compares the number to stored redial sequences and redials a sequence having a matching first number. For example, caller 170 dials a first number and then an extension, after a pause, to connect with caller 160. Redial logic 114 stores the number and the extension with a trigger. When caller 170 subsequently dials the first number and the presses the redial button, says "redial", or provides a similar indication, redial logic 114 matches the first number with the redial sequence comprising the first number in data 116 and dials the extension after a message is played and identified as the trigger associated with the extension.

Gateway 120, such as a Parlay Gateway, may facilitate communications between networks by converting communications from one network to another. In particular, gateway 120 communicates with networks 130 and 140 via network interface 124, communicates with application server 110 via application server interface 122, and converts messages between application server interface 122 and network interface 124. For example, gateway 120 may comprise API's for an Internet protocol (IP) network, a PSTN, a digital corporate telephone network, a mobile or wireless telephone network such as global system for mobile communications (GSM), time division multiple access (TDMA), general packet radio service (GPRS), enhanced data rates for global evolution (EDGE), code division multiple access (CDMA), CDMA2000, and the like.

Networks 130 and 140 may comprise telephone networks based upon the same or different network protocols. For instance, network 130 may comprise a GSM, GPRS network for region A and network 140 may comprise a GSM, GPRS network for region B or network 130 may comprise a CDMA based network for region A and network 140 may comprise a TDMA based network or a PSTN covering region A.

Networks 130 and 140 couple to facilitate connections between subscribers such as between caller 160 and caller 170. Network 130 comprises a switch 132, a resource manager 134, and data 136. Switch 132 routes connections between callers and routes a line event to application server 110 based upon an association between the line event and application server 110, e.g. a caller associated with the line event has subscribed to a service implemented with application server 110. Switch 132 can comprise logic to route the line event or may receive instructions from resource manager 134 to route the line event to application server 110.

Resource manager 134 may associate the line event with a service subscriber such as caller 160 and determine an association between the service subscriber and application server 110. For example, caller 160 subscribed to a redial function implemented by application server 110 so resource manager 134, upon receiving a line event initiated by caller 160 such as dialing "*99", saying "redial", or the like, and associating the line event with application server 110, begins routing line events associated with caller 160 to application server 110. In particular, resource manager 134 compares caller 160 to a list of subscribers associated with application server 110, as indicated in data 136, to associate caller 160 with application server 110. In many embodiments, the types of line events that application server 110 uses to process the redial function are stored or represented in data 136 so that resource manager 134 selects line events to route to application server 110 based upon data 136.

Resource manager 134 may also interpret line events prior to communicating the line events to application server 110. For instance, resource manager 134 detects a numbers; determines a length of a pause between numbers or associates line events with a timeline; recognizes a voice command; determines an beginning or end of a voice message;

detects a tone, a busy signal, a disconnection or a no answer; and the like. After detecting the line event, resource manager 134 transmits representations of the line events, such as numbers or a series of numbers, to application server 110. In other embodiments, application server 110 interprets one or more of the line events.

In other embodiments, a caller may access a redial function implemented with application server 110 via a first connection. For example, caller 170 subscribes to application server 110 via a calling card subscription. As such, caller 170 can access the redial function from a number of different phones including a mobile phone, an office phone, and phones at hotels while caller 170 is on business trips. Caller 170 dials a number to establish a first connection to menu system 150 and enters a first sequence of numbers, says redial, presses a redial button, enters a code such as "*57", or the like, to redial a number to re-establish a telephone connection via a previously dialed telephone number. Menu system 150 then communicates with resource manager 134 to transmit a request to redial a previously dialed number. In some instances wherein multiple dialed numbers are stored in a queue, one or more digits entered by caller 170 may identify the desired redial sequence.

Figure 2:
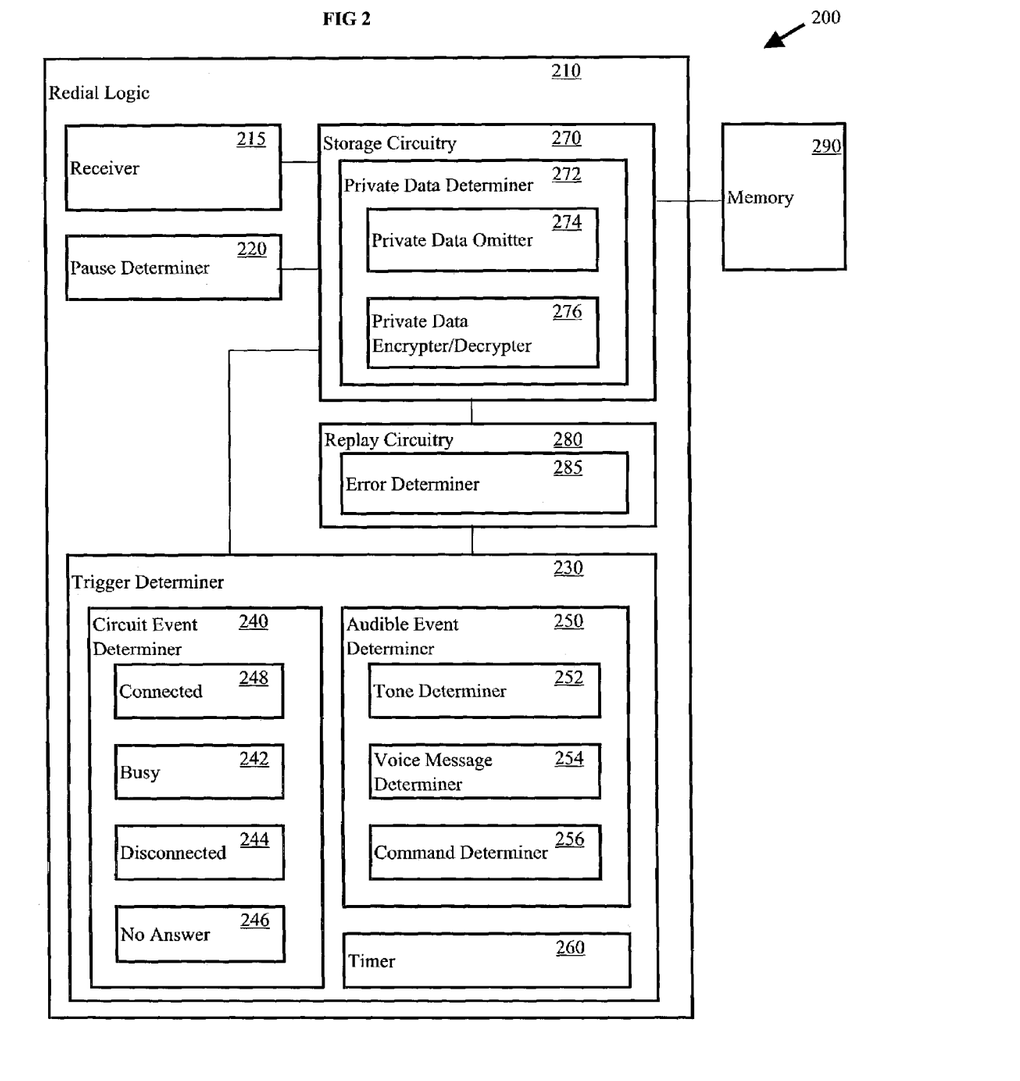
FIG. 2 depicts an embodiment of an apparatus to store and replay line events to re-establish a telephone connection to capture a dialing sequence to redial.

Referring now to FIG. 2, there is shown an embodiment of an apparatus 200 to capture a dialing sequence to redial. Apparatus 200 may comprise part of an application server such as application server 110 of FIG. 1, part of a switch such as switch 132 of FIG. 1, or may comprise part of a telephone coupled with a telephone keypad to provide redial functionality. Apparatus 200 comprises a redial logic 210 and a memory 290. Redial logic 210 may receive digits associated with a telephone keypad, such as numbers output by a modem or a telephone, wherein pauses between numbers facilitate one or more intermediate node connections to establish a telephone connection for a caller.

Redial logic 210 comprises a receiver 215, a pause determiner 220, a trigger determiner 230, and a storage circuitry 270. Receiver 215 receives digits representing buttons of a telephone keypad in the form of analog or digital signals such as tones, electrical signals, or packets and converts the digits to a digital form, when applicable, for storage in memory 290.

Pause determiner 220 receives timing information associated with the numbers or associates timing information with digits based upon a signal received to determine whether a pause between numbers is equal to or longer than a timer threshold. The timer threshold may be a timer period selected for determining when a pause between numbers facilitates an intermediate node connection. For example, a first sequence of numbers connects to an intermediate node wherein a menu system requests input from the caller. The pause provides time to progress to the next level or step of the menu system.

When the pause is equal to or longer than the timer threshold, trigger determiner 230 determines a trigger to associate with redialing a subsequent number based upon the length of the pause or a line event that occurred during the pause. On the other hand, when replaying the numbers, trigger determiner 230 is coupled with replay circuitry 280 to match a line event with the trigger associated with the pause.

Trigger determiner 230 comprises a circuit event determiner 240, an audible event determiner 250, and a timer 260. In many embodiments, trigger determiner 230 determines the last of the line events that occur during a pause and associates the last line event with the trigger to model a substantially equivalent pause in the redial sequence. In other embodiments, a line event is selected as a trigger based upon a priority established for the trigger or is selected by a set of rules adapted to optimize the redial sequence for a user or a set of users. For example, networks, menu systems, or the like that comprise an intermediate node for telephone connections may incorporate tones to facilitate the redial function. The tones may indicate when a menu system is available to accept an input or when an intermediate node is available to receive a number. Thus, the trigger selected is the tone if the tone is detected during a pause, or the latter of the line events if a line event occurred. Otherwise, the trigger is the time period of the pause.

Circuit event determiner 240 determines whether a circuit event such as connected 248 occurred during the pause when storing a sequence of numbers to redial. If busy 242, disconnected 244, or no answer 246 is detected during the pause then storing the redial sequence ends at the current connection or is canceled. On the other hand, during a redial, circuit event determiner 240 monitors the line for connected 248, busy 242, disconnected 244, or no answer 246 to determine whether to proceed with redialing the next number. For example, when redialing multiple numbers, circuit event determiner 240 determines that after dialing the first set of number, a connection is made to an intermediate node. However, when the second number was dialed, busy 242 detects a busy signal. The user is prompted to decide whether to redial the second number again, to camp on the node associated with the second number, or to cancel the redialing sequence.

Audible event determiner 250 determines an audible event that occurs during the pause or during a redialing sequence. Audible event determiner 250 comprises a tone determiner 252, a voice message determiner 254, and a command determiner 256. Tone determiner 252 determines a tone associated with the pause when capturing a redialing sequence. The tone may be output by a node to indicate the ability to receive additional numbers, or the next number in a redialing sequence.

Voice message determiner 254 may recognize a voice message on the line and associate the voice message with a trigger for a pause. In some embodiments, the end of the voice message is established as the trigger. However, when the subsequent number is inserted during the voice message, the beginning of the message is selected as the trigger.

Command determiner 256 may determine whether a command received from the user may override a trigger. The command from the user can be in the form of pressing a button like a redial button or stating, "redial". For example, a user dials a first number of 11 digits to connect to a menu system, after the voice message begins to play, the user says, "redial" and then presses the next number. "Redial" is recognized as a command by command determiner 256 and is interpreted, in this context, to indicate that trigger determiner 230 should disregard other potential triggers and set a trigger based upon the time elapsed since the beginning of the pause or based upon a recent line event. While redialing, command determiner 256 interprets a command as an indication to proceed with dialing the next number.

Timer 260 provides a measure of time for a pause. Timer 260 may determine an elapsed time during a pause to set a trigger or may measure the time elapsed since a replaying a prior number to determine when to replay the subsequent number if the trigger is a length of time.

Storage circuitry 270 may store a number and a trigger in memory 290 and associate the number with the trigger in response to an indication by pause determiner 220. As a result, the numbers can be replayed with an interval between a first number and a subsequent number, wherein the interval is based upon a trigger received from trigger determiner 230. Replay circuitry 280 may also communicate with storage circuitry 270 to retrieve numbers and triggers to re-establish a telephone connection.

In several embodiments, storage determiner 270 comprises a private data determiner 272. Private data determiner 272 can be configured to determine private data to protect or to protect all data as private data, including numbers and triggers. In particular, numbers of a redial sequence may include pin numbers, credit card numbers, calling card numbers, social security numbers, and the like. Private data determiner 272 may comprise private data omitter 272 and private data encrypter/decrypter 276. Private data omitter 272 omits digits in response to a command by the user. For example, after dialing a sequence of digits, the user says "omit" and command determiner 256 recognizes the command and forwards the command to private data omitter 274. Private data omitter 274, based upon prior configuration, omits the previous number or the subsequent number.

Private data encrypter/decrypter 276 may encrypt a number or an entire redialing sequence and may require a password to decrypt the number. For instance, after dialing a number, the user says "private" and command determiner 256 recognizes the command and informs private data encrypter/decrypter 276. Private data encrypter/decrypter 276, based upon prior configuration, encrypts the previous number or the subsequent number and storage circuitry 270 stores an indication regarding the encrypted data in memory 290.

Alternatively, the caller may, after completing a telephone call or disconnecting from the telephone connection, say "private" or press "#90" to indicate that the entire redialing sequence is to be encrypted. For example, the caller may conclude a telephone call and hang up. Then, the caller may pick up the receiver, press "#90", and enter a password to encrypt the entire redialing sequence. When the caller tries to use the redialing sequence, the caller will be prompted for the password. In other embodiments, a default password may be used if a password is not entered. In other embodiments, the redialing sequence may be encrypted by default unless the caller indicates that the redialing sequence should not be encrypted.

Replay circuitry 280 may replay the captured redialing sequence with an interval between numbers associated with a trigger, to re-establish a prior telephone connection in response to a request to redial. In some embodiments, pressing the redial button or voicing "redial" may override the trigger and replay a subsequent number immediately or without waiting to identify a line event matching a trigger associated with the pause between the numbers.

Replay circuitry 280 comprises an error determiner 285. Error determiner 285 recognizes when a trigger associated with a redialing sequence is not going to occur, ends the redialing sequence, and prompts the caller for additional input. For example, a menu system may be updated and an additional question may be posed to the caller. Error determiner 285 may determine that an additional question has been asked because the system failed to connect to another intermediate node, or a similar error, and inform the caller of the error. The caller may input a command to reduce the redial sequence by one or more numbers and to initiate the new redialing sequence. On the other hand, the caller may hang up to cancel the redialing sequence or may enter a command to delete the redialing sequence. For instance, a menu system may change when part of a telephone network is down or busy so the caller can retain the redialing sequence for future use.

Figure 3:
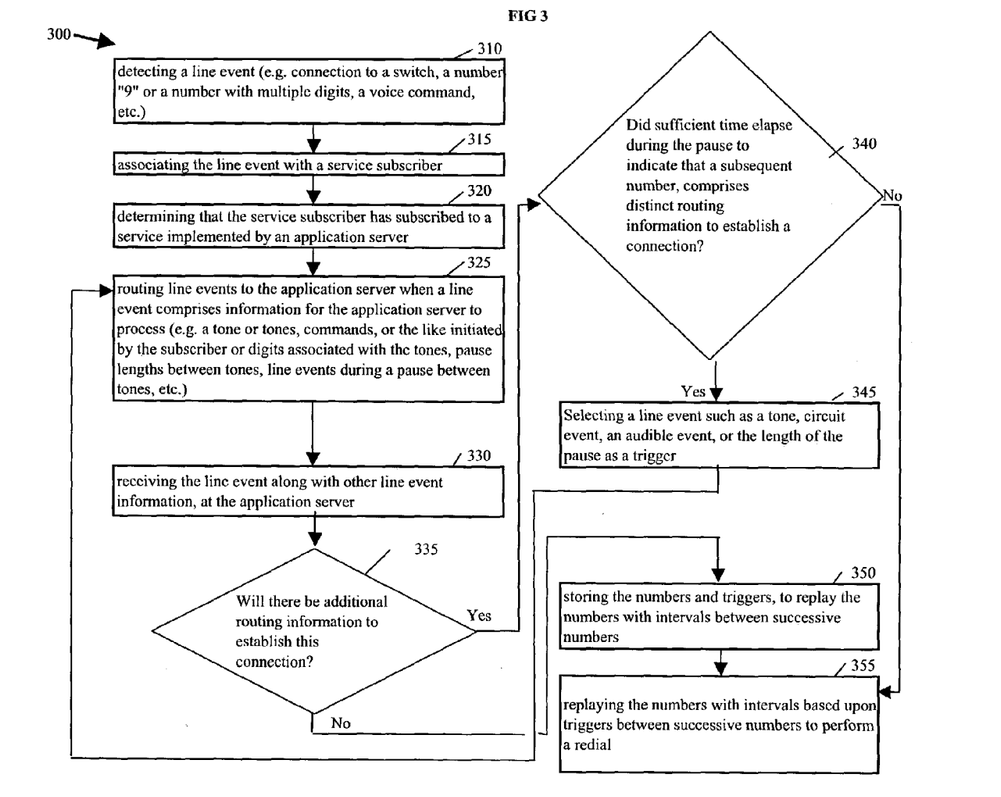
FIG. 3 depicts an example flow chart of a method to capture a dialing sequence to redial.

FIG. 3 depicts an example flow chart 300 of a method to capture a redialing sequence and to replay the redialing sequence. Flow chart 300 begins with element 310, detecting a line event. Detecting a line event may comprise detecting when a caller lifts a receiver of a telephone or, in many embodiments, providing a command or number to be processed by a redial service. For example, in a corporate telephone network, a telephone system recognizes that an employee lifts a receiver and dials "9" for an outside line. Then, the employee inputs a command to redial a previously dialed number such as by a voice command, a button, or a key sequence. The command, or a representation thereof, may be forwarded to an application server to implement a redial. Otherwise, the dialing sequence input by the employee is captured and stored in a redialing sequence queue.

In element 315, the line event is associated with a service subscriber, or caller. In particular, the current call is associated with the employee or the office extension. In some embodiments, the employee enters an identification number such as an employee number or a project number, or both, and the redialing sequence queue or queues associated with the employee and/or the project can then be associated with the call.

In element 320, determining that the service subscriber has subscribed to a service implemented by an application server, may comprise determining whether the project that the employee is on has subscribed to the redial service. In particular, a third party or a separate cost center offers the redial service to the project and the project pays for the service, or part thereof. In other embodiments, the application server may be part of the corporate telephone network and all employees or corporate telephones may be subscribed to the service.

Routing line events to the application server when a line event comprises information for the application server to process (element 325) includes filtering the information forwarded to the application server or selecting information to send to the application server. For instance, if the employee says "conference" which is a command associated with a second application server, the command is not forwarded to the first application server. On the other hand, if the employee then says "redial" and presses "6", the redial command and the digit "6", or representations thereof, are forwarded to the first application server, the server implementing a redial function.

Receiving the line event, like a number, along with other line event information, at the application server (element 330) comprises receiving information and/or commands from the employee that is associated with capturing a redialing sequence or replaying a redial sequence. When a pause occurs between numbers to establish the telephone connection (element 335) then the time elapsed during the pause is used to determine whether a subsequent number comprises distinct routing information to establish the connection (element 340). More specifically, if the length of the pause indicates that a subsequent number is distinct routing information then a trigger such as a tone, a circuit event, an audible event, or the length of the pause, is determined (element 345) and the additional line events are forwarded to the application server at element 325.

Otherwise the numbers and triggers are stored so that the numbers can be replayed with intervals between successive numbers (element 350). The redialing sequence is then available for a subsequent call or subsequent calls. In other embodiments, storing the numbers and triggers, for replaying the numbers with intervals between successive numbers (element 350) offers an option to protect sensitive information such as pin numbers and calling card numbers. For example, the project may protect redialing sequences associated with charging a long distance call to a project account and may restrict access to the password to the members of the project that will use the long distance account in their ordinary course of business.

After a redialing sequence is stored, replaying the numbers with intervals based upon triggers between successive numbers to perform a redial (element 355) can be implemented with a command to the application server to redial, e.g. saying "redial". In the present example, a project likely develops several sequences to redial, thus, after one member of the project dials a long distance number on behalf of the project, the number is stored and made available to the remainder of the project. For example, the procurement manager enters a dialing sequence, disconnects from the vendor, lifts the receiver and provides an identification for the redialing sequence such as "PLC vendor". When a member of the project next dials a corresponding sequence of digits, the application server may state "press redial to dial 'PLC vendor'". The project member continues to dial the number if the member desires to connect with someone other than the "PLC vendor" or presses the redial button to call the "PLC vendor". Further, when redialing sequences stored in a queue for a project are similar, the redial logic of the application server waits until sufficient digits are entered to differentiate the sequences or to reduce a list of sequences down to a selected number of sequences.

Figure 4:
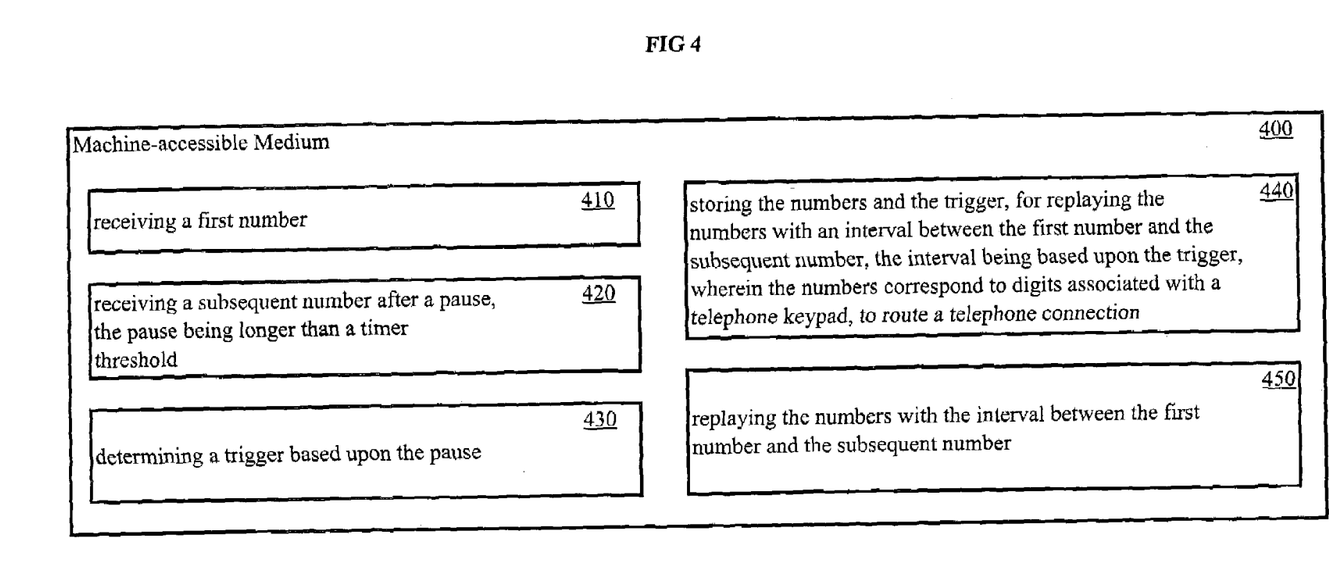
FIG. 4 depicts an embodiment of a machine-accessible medium comprising instructions to capture a dialing sequence to redial.

Referring now to FIG. 4, a machine-accessible medium embodiment of the present invention is shown. A machine-accessible medium includes any mechanism that provides (i.e. stores and or transmits) information in a form readable by a machine (e.g., a computer), that when executed by the machine, can perform the functions described herein. For example, a machine-accessible medium may include read only memory (ROM); random access memory (RAM); magnetic disk storage media; optical storage media; flash memory devices; electrical, optical, acoustical or other form of propagated signals (e.g. carrier waves, infrared signals, digital signals, etc.); etc. Several embodiments of the present invention can comprise more than one machine-accessible medium depending on the design of the machine.

The embodiment 400 may comprise instructions for receiving a first number (element 410); receiving a subsequent number after a pause, the pause being longer than a timer threshold (element 420); determining a trigger based upon the pause (element 430); storing the numbers and the trigger, to replay the numbers with an interval between the first number and the subsequent number, the interval being based upon the trigger, wherein the numbers correspond to numbers associated with a telephone keypad, to route a telephone connection (element 440); and replaying the numbers with the interval between the first number and the subsequent number, to re-establish the telephone connection in response to a request to redial (element 450). Instructions for receiving a first number (element 410) includes instructions for receiving one or more digits in a series and, when a pause interrupts the series of digits, instructions for receiving a subsequent number after a pause, the pause being longer than a timer threshold (element 420). Comparing the length of the pause to a timer threshold in element 420 facilitates distinguishing between pauses that do and do not impact the establishment of the telephone connection. For instance, outputting out all digits in a series and ignoring significant pauses will not correctly connect phone lines since intermediate nodes are unavailable to receive the routing information directed toward those nodes when the nodes have not yet connected to the line.

Instructions for determining a trigger based upon the pause (element 430) select a trigger from available line events or as the length of a pause between digits, to determine when to replay a number subsequent to the pause. In many embodiments, selecting a line event is more accurate than determining the length of the pause because connection times to intermediate nodes can vary. Further, waiting the full length of the pause is unnecessary if the person that originally dialed the number paused longer than necessary between dialing digits.

Instructions for storing the numbers and the trigger, to replay the numbers with an interval between the first number and the subsequent number, the interval being based upon the trigger, wherein the numbers correspond to numbers associated with a telephone keypad, to route a telephone connection (element 440) stores the numbers and trigger(s) in a manner that facilitates identifying the redialing sequence and facilitates redialing the numbers with pauses substantially similar to the original pauses. In some instances, the redialing sequence is time optimized by associating circuit events or audible events on the line with when subsequent digits or sets of digits can be dialed.

Instructions for replaying the numbers with the interval between the first number and the subsequent number, to re-establish the telephone connection in response to a request to redial (element 450) is adapted to redial a previously dialed number based upon the redialing sequence as stored in memory. In many embodiments, multiple redialing sequences are stored in a queue and can be accessed by a caller via a menu system or by the system's recognition of a sequence being dialed by the caller.

It will be apparent to those skilled in the art having the benefit of this disclosure that the present invention contemplates involve methods, systems, and media to capture a redialing sequence and to redial. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of capturing a dialing sequence for subsequent redialing, the method comprising:
   receiving a first number;
   receiving a subsequent number after a pause, the pause being longer than a timer threshold;
   determining a trigger based upon a voice message that occurred during the pause; and
   storing the numbers and the trigger, for replaying the numbers with an interval between the first number and the subsequent number, the interval being based upon the trigger such that the interval during a replaying is determined by the occurrence of the voice message, wherein the numbers correspond to digits associated with a telephone keypad, to route a telephone connection.

2. The method of claim 1, further comprising replaying the numbers with the interval between the first number and the subsequent number, to re-establish the telephone connection in response to a request to redial.

3. The method of claim 2, wherein replaying the numbers comprises:
receiving a subsequent sequence of digits;
comparing the subsequent sequence of digits with the numbers; and
replaying the numbers with the interval between the first number and the subsequent number in response associating the subsequent sequence of digits with the numbers.

4. The method of claim 1, further comprising:
detecting a line event; and
routing the line event to an application server based upon an association between the line event and the application server.

5. The method of claim 4, further comprising:
associating the line event with a service subscriber; and
determining an association between the service subscriber and the application server.

6. The method of claim 1, wherein receiving a first number comprises receiving one of a series of digits prior to the pause.

7. The method of claim 1, wherein storing comprises encrypting a set of digits of the numbers that correspond to private data.

8. An apparatus for capturing a dialing sequence for subsequent redialing, the apparatus comprising:
a receiver to receive a first number and, after a pause, a subsequent number;
a pause determiner to determine that the pause is longer than a timer threshold;
a trigger determiner to determine a trigger based upon an audible event that occurred during the pause, wherein the audible event is selected from the group consisting of a tone detected during the interval and a voice message occurring during the interval; and
storage circuitry to store the numbers and the trigger, for replaying the numbers with an interval between the first number and the subsequent number, the interval being based upon the trigger, wherein the numbers correspond to digits associated with a telephone keypad, to route a telephone connection.

9. The apparatus of claim 8, further comprising circuitry to replay the numbers with the interval between the first digit and the subsequent digit, to re-establish the telephone connection in response to a request to redial.

10. The apparatus of claim 9, wherein circuitry to replay the digits comprises circuitry to compare a subsequent sequence of digits with the numbers and to replay the numbers with the interval between the first number and the subsequent number in response associating the subsequent sequence of digits with the numbers.

11. The apparatus of claim 8, further comprising a switch to route a line event to an application server based upon an association between the line event and the application server.

12. The apparatus of claim 11, further comprising a resource manager to associate the line event with a service subscriber and determine an association between the service subscriber and the application server.

13. A machine-accessible medium containing instructions, which when executed by a machine, cause said machine to perform operations, comprising:
receiving a first number;
receiving a subsequent number after a pause, the pause being longer than a timer threshold;
determining a trigger based upon an audible event that occurred during the pause, wherein the audible event is selected from the group consisting of a tone detected during the interval and a voice message occurring during the interval; and
storing the numbers and the trigger, for replaying the numbers with an interval between the first number and the subsequent number, the interval being based upon the trigger, wherein the numbers correspond to digits associated with a telephone keypad, to route a telephone connection.

14. The machine-accessible medium of claim 13, further comprising replaying the numbers with the interval between the first number and the subsequent number, to re-establish the telephone connection in response to a request to redial.

15. The machine-accessible medium of claim 14, wherein replaying the digits comprises:
receiving a subsequent sequence of digits;
comparing the subsequent sequence of digits with the numbers; and
replaying the numbers with the interval between the first number and the subsequent number in response associating the subsequent sequence of digits with the numbers.

16. A machine-accessible medium containing instructions, which when executed by a machine, cause said machine to perform operations, comprising:
detecting entry of a first series of telephone keypad entries and storing data indicative of the first series;
detecting a first voice message played after said entry of the first set of keypad entries;
responsive to detecting entry of a second series of telephone keypad entries during the first voice message, storing data indicative of a beginning of the first voice mail message as a first trigger;
responsive to detecting entry of the second series of telephone keypad entries after an end of the first voice message, storing data indicative of the end of the first voice mail message as the first trigger; and
replaying the first series of telephone keypad entries, detecting an event corresponding to the first trigger, and, responsive thereto, replaying the second series of telephone keypad entries.

17. The machine readable medium of claim 16, said operations further comprising, responsive to detecting a redial command during said replaying, replaying the second series of telephone keypad entries without regard to said detecting of the event corresponding to the first trigger.

18. The machine readable medium of claim 17, said operations further comprising, detecting entry of a password command after said entry of the second series of telephone keypad entries, assigning a password to the data indicative of the first series, the first trigger, and the second series; wherein said replaying comprises replaying the first series after detecting entry of the assigned password.

* * * * *